(12) United States Patent
Ward et al.

(10) Patent No.: US 8,088,431 B2
(45) Date of Patent: Jan. 3, 2012

(54) HEALTH BARS AND COMPOSITIONS FOR IMPROVING MENTAL AND PHYSICAL ENERGY

(75) Inventors: Philip C. Ward, Palmyra, PA (US);
Julie Emsing Mann, Hershey, PA (US);
Debra L. Miller, Palmyra, PA (US)

(73) Assignee: The Hershey Company, Hershey, PA (US)

( * ) Notice: Subject to any disclaimer, the term of this patent is extended or adjusted under 35 U.S.C. 154(b) by 834 days.

(21) Appl. No.: 12/049,002

(22) Filed: Mar. 14, 2008

(65) Prior Publication Data

US 2008/0226786 A1 Sep. 18, 2008

Related U.S. Application Data

(60) Provisional application No. 60/906,820, filed on Mar. 14, 2007.

(51) Int. Cl.
*A23G 1/00* (2006.01)
(52) U.S. Cl. ........ 426/631; 426/103; 426/573; 426/584; 426/593; 426/656; 426/658; 426/661
(58) Field of Classification Search .......... 426/593, 426/584, 656, 658, 661, 103, 573, 631
See application file for complete search history.

(56) References Cited

U.S. PATENT DOCUMENTS

| 5,486,376 | A | 1/1996 | Alander et al. |
|---|---|---|---|
| 6,773,744 | B1 | 8/2004 | Ward et al. |
| 2002/0045002 | A1 | 4/2002 | Kealey et al. |
| 2004/0013707 | A1 | 1/2004 | King et al. |

OTHER PUBLICATIONS

LaBau, A Guide to Chocolate Varieties, CANDY, About.com:Candy, Jan. 31, 2011, pp. 1 and 2.*
Crafton, Sharon, Diet and Nutrition Info!'"AYDS Diet, ", www.diet.freelifestylebiz.com/ayds-diet/ pp. 1 and 2, 1970.*
International Search Report of PCT/US08/57115 filed Mar. 14, 2008, and Written Opinion of ISA dated Jun. 25, 2008.
International Preliminary Report on Patentability for PCT/US08/57115 filed Mar. 14, 2008, dated Sep. 8, 2009.

* cited by examiner

*Primary Examiner* — Helen F Heggestad
(74) *Attorney, Agent, or Firm* — Wiley Rein LLP

(57) ABSTRACT

The invention provides, in one aspect, a health bar or composition having high levels of a cacao-based product, and with correspondingly high levels of cocoa anti-oxidants, that are shelf stable, heat-resistant, and have good taste and mouthfeel properties. The energy bars and food compositions can deliver healthful cocoa ingredients to improve vigor, enhance physical energy, enhance mental energy, enhance cognitive focus abilities, and/or improve athletic performance. Methods of making such health bars, food ingredients, or heat-resistant compositions that comprise the same high levels of cacao product and other ingredients in effective amounts and that are shelf-stable are also disclosed.

24 Claims, No Drawings

HEALTH BARS AND COMPOSITIONS FOR IMPROVING MENTAL AND PHYSICAL ENERGY

REFERENCE TO RELATED APPLICATIONS

This application claims full priority benefit of U.S. Provisional Application 60/906,820, filed Mar. 14, 2007, the entire contents of which are hereby incorporated by reference.

FIELD OF THE INVENTION

The invention relates to food products and ingredients that comprise combinations of compounds that alone and together can measurably enhance reported levels of mental energy, cognitive focus, and/or physical energy and especially during physical exercise or activity, such as during a sporting activity. The health bars, ingredients and products of the invention are heat-resistant, easily portable, and conveniently consumable. In preferred embodiments, the invention encompasses a health bar that contains high levels of cocoa, is shelf stable, and consumable before or during physical activity, as well as methods to make and effectively administer the health bars. As shown below, administration of exemplary health bars improves an athlete's score on several different performance related criteria.

RELEVANCE OF THE INVENTION AND DESCRIPTION OF RELATED ART

Energy bars or drinks have been suggested for use by athletes that generally contain caffeine and sugars to stimulate or sustain alertness. High-protein bars have also been formulated for those attempting to gain muscle mass and strength. In addition, vitamin and other supplements are used in certain diets, again for specific conditions or consumers. The bars or supplements are not typically presented for use by the average consumer to increase mental and physical energy. Furthermore, refrigeration or cold storage is often not available for use during a sporting event. Thus the ideal health bar for consumption during a sporting event would be resistant to heat.

The combination of ingredients in the previously discussed bars or drinks, often including vitamins and other supplements, generally render them difficult to process into a stable bar format and not especially appetizing. The high protein levels can also absorb water, creating shelf stability problems. Furthermore, these products do not use cocoa as a healthful ingredient, but merely as part of a chocolate flavor, which generally employs only low levels of cocoa, necessarily delivering only low levels of cocoa anti-oxidants, below the minimal levels associated with healthful benefits.

From these deficiencies alone, one can conclude that new and improved methods for producing health bars and food ingredients with high levels of beneficial cocoa ingredients are needed.

SUMMARY OF THE INVENTION

In one aspect, the invention relates to the use of cocoa in novel bars, food ingredients or compositions to provide mental and physical energy or to improve performance or well-being during physical and/or mental stress, such as competitive athletic events. In another aspect, the invention relates to methods to produce health bars and compositions to generate a shelf stable, heat stable, and appetizing food product, as well as the food products themselves. In preferred aspects, the bars can contain specific ranges of available energy from carbohydrates/protein/fats, as recommended in certain diets or for certain populations. While high levels of cocoa, such as natural cocoa powder, cocoa liquor, or other cocoa solids-containing ingredients, are generally avoided in health bar-type products because of the astringent taste properties associated with cocoa, the bars of the invention can be made with acceptable and pleasant taste profiles even with high levels of natural cocoa. For example, over 20% or 25% or up to about 30% or even about 35% natural cocoa powder can be used in the health bars or food ingredients of the invention.

Thus, it is one object of the invention to provide a good tasting, chocolate-like product with a stable chewy and/or fudge-like texture that can deliver high levels of cocoa solids per standard serving of product. In particularly preferred embodiments, low-fat or non-fat cocoa solids are used as the cocoa product or one of the cocoa-containing products present. The concentrated level of cocoa solids used makes it possible for one to deliver high levels of cocoa anti-oxidant or polyphenol compounds, which have been shown to provide specific health benefits.

In another aspect, the invention involves the use of, and method of producing, a unique solid matrix for a health bar or composition in conjunction with high levels of cocoa or low to non-fat cocoa solids, and at levels similar to high cacao-containing standard chocolates and dark chocolate bars (typically 35%-70% or more cacao). In preferred embodiments, these high levels of cacao are achieved in a matrix that is at least 50% lower in fat and about 20% lower in calories than standard dark chocolate bars. The products and methods of the invention, and perhaps in particular the increased level of cocoa powder used, also provides superior heat resistance, such that the product can withstand temperatures in excess of 120 degrees F. without melting or becoming messy and undesirable for consumer handling. Furthermore, the characteristics of the high cacao compositions of the invention unexpectedly produce extrudable and rollable compositions without added water or required drying times, meaning the methods of the invention can be incorporated into a continuous process stream rather than a time-consuming, batch processing method as previously used. Conventional methods with the levels of cocoa as used herein, such as with the added cocoa powder, result in clumping and unflowable mixtures. In addition, the heat-resistant compositions do not require high levels of added starches or polyols to stabilize them.

The invention provides, in one aspect, a method of improving energy level in a subject by administering a heat-resistant, consumable cocoa anti-oxidant containing composition having about 8 grams or more of cocoa powder per dose, or the equivalent in cocoa solids, and given approximately one hour before and/or during physical activity. The amount of cocoa powder or equivalent can vary, as noted above, but a preferred range is about 8 to about 12 grams per serving or dose, or about 10 grams per serving or dose. In other embodiments, especially those involving methods to deliver certain amounts or high levels of cocoa or cocoa antioxidants or polyphenols per day, for example above 20 grams cocoa, or about 36 grams cocoa powder or its equivalent per day, and optionally over a sustain period of daily or multiple times per day treatment. Available or suggested regimens for a variety of health benefits or prophylactic treatments have been reported in the field, and the products, ingredients and methods of the invention can be useful in delivering, for example, about 20 to about 30 grams of cocoa powder or its equivalent per day, or about 30 to about 40 grams, or about 40 to about 50 grams, of even more than 50 grams of cocoa powder or its equivalent per day. The amount of cocoa present in a serving size or per gram can also be very high by the use of the invention, such as about 15 to about 20 or about 30 grams per serving size. Accordingly, multiple bars can be taken per day to deliver a desired amount of cocoa powder, its equivalent, or a desired amount of cocoa antioxidants or polyphenols per day, such as about 24 grams per day or about 75 grams per day of cocoa powder. Such administration regimens can have benefits in addition to the improved mental and physical energy effects noted here, such as improved cardiovascular condition or an improvement in the risk factors associated with cardiovascular or atherosclerotic conditions. The beneficial effects of cocoa antioxidants and polyphenols are known in the art, and the invention specifically includes the use of the products, bars, and ingredients to administer desired doses of cocoa or cocoa antioxidants or polyphenols, or any other specific compound naturally found in cocoa beans or nibs, to a person or animal. The amount of other foods consumed just before and during physical activity can be limited in order to maximize the energy-delivering effect, or minimize interference with the effect. When administered prior to or during physical activity, the effect on reported energy levels can be measured during and after the physical activity through standard means available in the art. In particular, questionnaires or other sampling of subjects to record physical energy levels, mental energy levels, ability to focus or concentrate on activity, or exhaustion or fatigue can be collected, and this data can be compared to controls where no cocoa solids or lower levels of cocoa solids are administered.

In another aspect, the invention provides a convenient health bar matrix capable of containing high levels of cocoa powder or cocoa solids, and which is specifically designed for use consistent with outdoor or physical activity. Thus, in one aspect, the health bar matrix is heat-resistant and shelf stable for at least about one month, or at least about 3 months, or at least about 6 months, or at least about 9 months, or about 12 months.

In yet another aspect, the invention provides a consumable composition, such as a chocolate bar, an energy bar, or food ingredient, that comprises about 20% or more cocoa solids and about 20% fat or less. Preferred ranges include about 20% to about 28% cocoa solids, and about 10% to about 20% fat. The cocoa solids can be provided in one or more available cocoa products produced from the cacao bean, such as cocoa powder or cocoa liquor. Various sources of cacao bean products are available and any one or any combination can be selected. In particular, the cacao bean source for a cocoa powder can be selected from one or more of unroasted cacao beans, unfermented cacao beans, medium roasted cacao beans, highly roasted cacao beans, blanched cacao beans, washed cacao beans, cacao beans selected for enhanced levels of polyphenols or particular polyphenol compounds, and extracts or any of these. Low fat or defatted cocoa products, such as defatted cocoa powder or low fat cocoa powder, enzyme treated cocoa powders (soluble cocoa) can also be used, and any of the above cacao beans can be prepared as a low fat or defatted cocoa product for use. In addition, any combination of these cacao bean products can be used. A preferred source of cocoa solids for taste is natural cocoa powder, meaning fermented, medium to high roast cocoa that is not dutched or alkaline processed. In addition, natural cocoa powder can be supplemented with cocoa extract, powder, or other products produced from an unfermented source of beans or other beans produced to have higher levels of cocoa flavanols, as well as other similar polyphenol-containing products available in the art. Natural cocoa powder supplemented with about 2%, or about 5%, or about 7%, or about 10% by weight cocoa powder or cocoa extract having these high levels of cocoa flavanols.

In a more particular aspect, the invention provides an energy bar or food ingredient for consumption during physical activity, or compatible with packaging and storage and use conditions for outdoor or physical activity, comprising an amount of cocoa product equivalent to about 23% or more cocoa solids in the final product, about 20% total fat or less, about 0.5% or less of a carrageenan or mixture of carrageenans, and sugar or mixture of sugars. The energy bar or food ingredient can preferably contains about 180 total calories or less, and more preferably about 140 total calories or less. The energy bar or food ingredient can also contain one or more vitamin, mineral, food supplement, botanical, or plant or herb extracts or ingredients known in the art or used in health bars or food supplements. The bar matrix is particularly suited to handling food supplement ingredients with particle sizes less than 50 microns at levels that can be significantly meaningful with regard to established dietary values. For instance, products with 50% (500 mg) or even 100% (1000 mg) of calcium (recommended daily amount or RDI) have been prepared with very acceptable organoleptic properties. In particular embodiments, the energy bar or food ingredient of the invention can comprise a fruit juice or extract, an herb or herb flavor, natural or artificial flavors, vitamins, minerals, antioxidant containing extracts, coenzyme Q, omega-3 fatty acids, guarana, caffeine, theobromine, epicatechin, EGCG (epigallocatechin gallate), maltodextrin, polyphenols, protein, and plant phytosterols. In another preferred embodiments, the energy bar or food ingredient can have total available energy levels of carbohydrates/protein/fat of 40/30/30 respectively. In another aspect, the energy bar or food ingredient can have a water activity level of about 0.5 or lower, or about 0.6 or lower.

In yet another general aspect, the invention comprises methods of producing an energy bar or food ingredient as described above or herein. In particular, the methods are an improvement or adaptation of the methods described in U.S. Pat. No. 6,773,744, which is specifically incorporated herein by reference. In one embodiment of the method to produce, or method to produce on a commercial scale or in a continuous production process, an energy bar or food ingredient having cocoa product equivalent to about 23% or more cocoa solids and about 20% total fat or less, the method comprising heating a bob syrup comprising water and sugar to a desired solids content of between about 70-85%. Alternatively, or in addition, the bob syrup component can be prepared without a heating or cooking to reduce the solids content through the use of specific ingredients. A component containing fat is added to the bob syrup or heated bob syrup and a cocoa product to a level equivalent to 20% cocoa solids or more is added. The mixture is extruded or slabbed and dried to a desired water activity level, such as below 0.6 or below 0.5. The method can further include adding a hydrocolloid to the bob syrup or heated bob syrup, such as a carrageenan or mixture of carrageenans. The sugar content is preferably limited to produce about 180 total calories or less, or 200 calories or less, per serving size.

As noted above and described in detail below, the products, bars, ingredients and/or compositions prepared as described in this disclosure and having elevated cacao product or cocoa powder levels can be used as, but are not limited to, supplements for athletic performance enhancement, mental energy or cognitive focus enhancement, and/or nutritional benefit. Exemplary supplements include, but are not limited to Vinpocetine, Vincamine Ginkgo Biloba, L-Arginine, Acetyl-L-Carnitine, Feverfew, DMAE (Dimethylaminoethanol), DMAE bitartrate, P-chlorophenoxyacetate, Vitamin B-Complex, Ginseng, 5 HTP (5-Hydroxytryptophan), L-Theanine, Androstenedione, L-Glutamine, L-Tyrosine, L-Glycine; L-lysine; Whey Protein; DHEA (Dehydroepiandrosterone).

In another aspect, the invention provides a nutritional bar, composition, or food product having 50% lower fat than a traditional chocolate bar by weight, a higher cocoa powder level than a chocolate bar by weight, and higher levels of polyphenols, antioxidants, flavanols and/or theobromine by weight than chocolate, and optionally without the addition of caffeine. In additional embodiments, the bar, composition, or food product comprises one or more of cocoa liquor, fruit, fruit extract, vanillin, caramel, mint, orange, or other flavors. In other or additional embodiments, the bar or food product further or alternatively comprises one or more of cocoa liquor, fruit or fruit flavor, sunflower oil, fructose, inulin, or chromium picolinate. Plant sterols can be added or used, where plant sterols includes, without limiting to this specific list, phytosterols, phytosterol esters, phytostanols, phytostanol esters, and more particularly various positional isomers, stereoisomers, hydrogenated forms and/or phytostanol esters of the following non-limiting list of general plant sterols: sitosterol, campesterol, stigmasterol, spinosterol, taraxasterol, brassicasterol, desmosterol, chalinosterol, poriferasterol, clionasterol, avenosterol, and ergosterol. The above compounds or extracts containing them can be used alone or in any combination to provide two or more plant sterols or stanols for the products, health bars, or ingredients of the invention. Other nutritional supplements, vitamins, and/or minerals can also be included, in particular co-enzyme Q10.

In particular aspects, the bar, food ingredient or product and the methods of using it involve a composition that possesses a low glycemic index, as known in the art. Furthermore, the bar, ingredient or product can be administered at various times or in multiple times during a day or during the physical activity, such as in the morning and evening, and administration can continue for periods of time, such as daily for at least four weeks or longer.

While preferred embodiments are described specifically here or given below and in the examples, the scope of the ingredients that can be selected for use should not be limited to those listed here. Other compositions containing the beneficial combinations, such as components with sufficient cocoa, can be made and used according to this invention to generate the advantageous results described here.

Throughout this disclosure, applicants refer to journal articles, patent documents, published references, web pages, and other sources of information. One skilled in the art can use the entire contents of any of the cited sources of information to make and use aspects of this invention. Each and every cited source of information is specifically incorporated herein by reference in its entirety. Portions of these sources may be included in this document as allowed or required. However, the meaning of any term or phrase specifically defined or explained in this disclosure shall not be modified by the content of any of the sources. The description and examples that follow are merely exemplary of the scope of this invention and content of this disclosure and do not limit the scope of the invention. In fact, one skilled in the art can devise and construct numerous modifications to the examples listed below without departing from the scope of this invention.

DETAILED DESCRIPTION OF EXEMPLARY EMBODIMENTS

In a general aspect, the health bars, food ingredients and products of the invention as designed to include beneficial levels of cocoa compounds, such as polyphenols, flavanols, anti-oxidants, epichatechins, resveratrols, or compounds that can effectively improve or enhance blood flow, induce nitrix oxide levels in the body, and especially improve blood flow to the brain. While compounds found in cocoa have been suggested as acting to improve blood flow, reduce blood pressure, or improve blood flow to the brain, there are currently no conveniently available or manufactured products with acceptable or appetizing taste characteristics with the high levels of cocoa solids required. In particular, health bars with reduced calories and/or reduced fat levels compared to other products with equivalent levels of cocoa solids have been produced and used in the methods described here.

Furthermore, the preparation and storage of a bar with such components presents numerous challenges. In addition, producing a palatable taste and acceptable mouthfeel through typical storage periods is difficult for products with at least the cocoa component levels described here.

In general, a preferred water activity (Aw) of less than about 0.6, or less than about 0.5, is used in the bar. A shelf life of over 12 months is also desirable, and heat-stability at 120 degrees F. is also desirable. One or a combination of these characteristics can be designed into a product or ingredient of the invention.

Many embodiments, bars and products of the invention may contain ingredients that are sensitive to water addition, namely chocolate liquor or cocoa powder. This is because there is either an increase in product viscosity due to water interaction with cocoa solids. As a result, a preferred process uses water with a minimal negative influence, which can be accomplished by handling all ingredients so that hydration and Aw are controlled. In one embodiment, this is done by a certain order of addition of ingredients and assuring complete mixing. Another possible step is to add the sensitive ingredients last, when batch temperatures are reduced to under 110° F. This approach of efficiently adding chocolate liquor, cocoa powder or other cocoa product at the end eliminates batch rheologies that are too high for practical extruding or slabbing and also helps to establish acceptable flavor or texture in the final product over a 12 month shelf life.

In any or in particular embodiment of the invention, one or more fruit ingredients can be used, such as fruit juices, which here encompasses fruit-based products and fruit juice concentrates and/or fruit extracts and/or essence of fruits or extracts. Any available fruit can be used for these juices, concentrates, or extracts, as well as any combination of two or more. However, preferred examples include: citrus fruits; orange; tangerine; cranberry; pomegranate; black currant; blueberry; grape; concord grape; white grape; pear; and apple. The combination of a fruit and the high levels of cocoa can provide a flavor that masks or blocks the sometimes bitter or astringent flavors in cocoa itself.

Similarly, elixirs, extracts and/or antioxidant preparations can be used as an additive, such as extracts of green tea, white tea, cacao beans or nibs, pomegranate, goji berry, mangosteen, Lychee, acai, grapeseed, blueberries, raspberries, cranberries, Japanese knotweed, or other antioxidant-containing food product, botanical, or other source. The other energy-providing ingredients can be one or more of caffeine, theobromine, guarana, taurine, and other compounds. In yet other aspects of the invention, a cocoa containing bar or ingredient can optionally contain other available or known supplements, active ingredients, appetite suppressing agents, and similar agents or ingredients, especially those also found in antioxidant-containing foods, herbs, teas, coffees, or food product ingredients. Further, the bars or ingredients may also or in addition be used or combined with one or more other dietary nutrients, such as vitamins, minerals, amino acids, etc., to provide a nutritional or dietary supplement. Any of these combinations of the invention can advantageously provide benefits to human health and capture additional beneficial effects. Also, all of the ingredients or combinations may be combined with appropriate stabilizers, emulsifiers, preservatives, binders, carageenans, and other edible or ingestible compounds known to one of skill in the art in the industry to produce a health bar or cocoa containing product.

In general and as used in this invention, the various cacao bean product or cocoa-containing extracts, products or compositions noted here refer to the terms as used in Minifie (Chocolate, Cocoa, and Confectionery, 3d ed., Aspen Publishers), specifically incorporated herein by reference. The cocoa-containing product used to produce the bars or products of the invention can be a cocoa powder, such as natural cocoa powder, dutched cocoa powder, extra fine or finely ground cocoa powder having average particle sizes less than 30 microns, high, medium, low fat, defatted, or non-fat cocoa powder, enzyme treated cocoa powder (soluble cocoa) unroasted cocoa powder, underfermented cocoa powder, unfermented cocoa powder, low roasted cocoa powder, heavily roasted cocoa powder, cocoa products produced from unfermented cacao nibs, cocoa products produced from unroasted cacao nibs, any of these products as an extra fine or finely ground cocoa product or powder having average particle sizes less than 30 microns, or less than 10 microns, or even less than 5 microns, and any combination of these cocoa products or powders. In another preferred embodiment, cocoa powder from fermented and heavily roasted, or very dark roast, beans can be used. In addition, various types of defatted or low fat or substantially fat free cocoa powders can be selected and used, such as one of more from the above in a defatted or low fat or fat-free state. One skilled in the art is familiar with the different degrees of roasting possible and the use of hygrometers or equilibrium relative humidity measurements to compare the degree of roasting. The cocoa-containing product can also be selected from one or more of: cocoa extracts containing flavanols, baking chocolate, chocolate liquor, cocoa extracts, cacao beans, cacao nibs, cocoa kibble, semisweet chocolate, bittersweet chocolate, and milk chocolate. The invention relates to food products and methods of producing or manufacturing food products that provide healthful benefits of the natural antioxidants found in cocoa and chocolate.

Preferably, the methods and products of the invention use natural cocoa or extracts that are not treated with alkaline, a process also known as "Dutching." However, as noted, a variety of cocoa powders, cocoa extracts, cocoa concentrates, cocoa compositions, and cacao bean compositions are known and available to one of skill in the art and can be selected for use in any aspect of the invention. In addition, cocoa products or extracts with enhanced levels of cocoa polyphenols or cocoa flavanols, or extracts with additives, can also be selected for use. Defatted or non-fat cocoa products, such as defatted cocoa powder, can also be used alone or with other cocoa products. Furthermore, combinations of available cocoa powders, extracts, enhanced extracts, concentrates, extracts with additives can be selected and used for any aspect of the invention. The terms "cocoa powder," "cocoa extract," and "cocoa or cacao bean product or composition" can be any of a variety of products and combinations as well as specific combinations of the cacao bean-derived products referred to or noted in this disclosure. In general and as used in this invention, the various chocolate and cocoa solids-containing products and compositions noted here refer to the terms as used in Minifie (Chocolate, Cocoa, and Confectionery, 3d ed., Aspen Publishers), specifically incorporated herein by reference. The cacao bean refers to the cacao bean, also called cocoa bean, in nature and a cocoa containing product is a product derived from or having some component derived from the cocoa bean. The nib refers to the cacao bean without the shell and is approximately 54% fat and 46% non fat solids on a dry basis. Non fat cocoa solids are the processed non fat solids of chocolate liquor. Cocoa powder refers typically to cocoa solids with a total of 10% to 12% fat, where the fat is generally cocoa butter. Breakfast cocoa is cocoa solids with 20 to 24% fat, where the fat is generally cocoa butter. Chocolate liquor (or cocoa liquor) is ground cocoa nibs and it can be separated into cocoa butter and cocoa solids. Cocoa butter is the fat component of chocolate liquor, whereas the remaining part of chocolate liquor is cocoa solids or the cocoa mass. As one of skill in the art understands, a certain amount or percentage of cocoa solids in a food ingredient can be achieved, inter alia, by using or adding an amount of cocoa powder, chocolate liquor, or other chocolate or cocoa ingredient containing the requisite amount of cocoa solids. Similarly, a certain amount or percentage of cocoa butter in a food ingredient can be achieved, inter alia, by using or adding an amount of chocolate liquor or other chocolate or cocoa ingredient containing the requisite amount of cocoa butter. Furthermore, while many different countries specifically define food products containing cocoa or cocoa products as having certain ranges or ingredients, the terms chocolate, milk chocolate, and dark chocolate, are as used commonly in the US food industry and do not imply, unless stated otherwise, a specific content. In addition, while a cocoa containing product having a particular anti-oxidant or polyphenol level is not required, the invention encompasses the use of cocoa containing products with enhanced, altered, or increased levels of anti-oxidants or polyphenol compounds as compared to conventional cocoa containing products. Other nutritional, therapeutic, or preventative ingredients can be added as well, as known in the art.

EXAMPLES

As described above, the high cocoa containing bars and ingredients of the invention can be produced in an advantageous way by combining a bob syrup component with a fat component and adding cocoa. Forming the first component can include combining water and sugar to form a bob syrup mixture; heating the mixture to above 170° F.; optionally adding a hydrocolloid to the heated mixture; and continuing to heat the mixture until a solids content of about 70-80 wt. % is obtained. The method further comprises forming a second component by combining a fat component and optional flavoring and mixing the first component and the second component at a temperature above the melting point of the fat to form a mixture. Cocoa, for example in the form of cocoa powder, can then be added. The resulting composition can be cooled and used in slab form or used to enrobe, fill a mould, be deposited between layers, or used in other ways, such as used directly into continuous processing methods. Typically, the first component and the second component are mixed at or nearly at a 50:50 ratio, however other ratios are possible, including 40:60, 60:40, 25:75, 75:25, 48:52, 52:48, 45:55, 55:45. In another aspect, the second component comprises about 1-55 wt. % of the fat, or 1-30%, or 1-20%, or 10-30%, or 20-40%, or 30-40%. One or more hydrocolloid can be selected and used in the bob syrup from any available or suitable source. Non-limiting examples include hydroxypropyl methylcellulose, gelatin, carrageenan, gum arabic, carboxymethyl cellulose, methyl cellulose, hydroxypropyl cellulose, locust bean gum, guar gum, pectin, xanthan, starch, maltodextrin, gum ghatti, gum arabic, gum karaya, gum tragacanth, dextran, konjac flour, aribinogalactan, gellan gum, agar-agar, furcellaran, and alginate. A humectant can optionally be added, preferably a mixture of sorbitol and glycerine. Humectants can also be selected from compounds or compositions generally referred to as sugar alcohols, such as one or more of glycerol, sorbitol, mannitol, xylitol, maltitol, hydrogenated starch hydrolysate, lactitol, isomalt, and erythritol. In particular embodiments, the fat component can be milled to an average particle size below 50 microns prior to the mixing step. In other particular embodiments, the fat selected for use is one or more of cocoa butter fat, canola oil, animal fat, vegetable fat, milkfat, a modified fat, a fat replacer, Salatrim, Olestra, cocoa butter, cocoa powder, reduced-fat cocoa powder, or cocoa butter alternatives (CBEs, CBIs, CBSs, CBRs). In addition, the fat component may comprise at least one of dark chocolate, milk chocolate, bittersweet chocolate, semisweet chocolate, white chocolate, chocolate liquor, or peanut butter. Also, the fat component may further comprise a protein, such as a milk protein or soy protein at actual fat contents that are typically below 15 wt. %

Production of Exemplary Health Bar

Many different flavors, flavoring agents, and ingredients can be selected for use with the basic bar containing cocoa. Preferred embodiments can include food ingredients or supplements having strong antioxidant properties. In the specific examples and recipes here, the components are selected for the desired taste, mouthfeel, heat stability, and shelf life characteristics. One of skill in the art is familiar with how to modify ingredient content to alter one or more of these characteristics, and thus these specific recipes should not be taken as a limitation of the scope of the compositions or bars made possible by this invention.

In a preferred health bar, the ingredients used are: sucrose, cocoa, chocolate liquor, high fructose corn syrup, cocoa butter, polydextrose, glycerine, corn syrup, sorbitol, and less than 2% of the following: milk fat, lactose, salt, carrageenan, soy lecithin, Aldo HMS mono- and diglycerides (emulsifier), PGPR (emulsifier), Vanillin.

In another preferred health bar, the ingredients are: Dark Chocolate [containing: sucrose, chocolate liquor, cocoa butter, cocoa powder, AMF (anhydrous milk fat), lactose, soya lecithin, PGPR (polyglycerol polyricinoleate), vanillin], sucrose, high fructose corn syrup, glycerine, polydextrose, corn syrup, sorbitol, and less than 2% of the following: salt, carrageenan, Aldo-HMS (emulsifier). Similar or equivalent ingredients from organic sources can be selected or used for one or any combination of the ingredients, and organic sweeteners and emulsifiers in particular can be used, such as sugars of organic cane juice.

A particularly preferred embodiment is listed in the table below.

TABLE 1

VP FORMULA - Example for a single serving 40 g bar having 11 g of natural cocoa powder

|  |  | % |
| --- | --- | --- |
| Dark Choc - fat component |  |  |
| Sucrose | 123.5 | 20.58141 |
| Chocolate Liquor | 72.4 | 12.06554 |
| Cocoa Butter | 29.5 | 4.916208 |
| AMF | 5 | 0.833256 |
| Lactose | 5 | 0.833256 |

TABLE 1-continued

VP FORMULA - Example for a single serving 40 g bar having 11 g of natural cocoa powder

|  |  | % |
| --- | --- | --- |
| PGPR | 0.25 | 0.041663 |
| Vanillin | 0.076 | 0.012665 |
| Cocoa Powder | 15.85 | 2.64142 |
| Soy Lecithin | 0.48 | 0.079993 |
|  | 252.06 | 42.01 |
| bob Syrup component |  |  |
| Water | 34.2 | 5.699468 |
| Sucrose | 61.56 | 10.25904 |
| HFCS 55 | 38.87 | 6.477729 |
| 43 DE Corn Syrup | 20.52 | 3.419681 |
| Glycerine | 27.36 | 4.559574 |
| Sorbitol 70% | 15.96 | 2.659752 |
| Salt | 1.14 | 0.189982 |
| Litesse 2 | 27.36 | 4.559574 |
| Carageenan, GP 911 | 0.57 | 0.094991 |
| Aldo-HMS | 0.46 | 0.07666 |
|  | 228.00 | 38.00 |
| Part 3: Cocoa solids |  |  |
| Cocoa powder | 120 | 19.99813 |
|  | 120 | 20.00 |
| Totals: | 600.06 | 100.00 |

After reducing the cooked or bob syrup to about 70-80% solids by weight, more preferably 78-80% solids, and the dark chocolate paste or fat component ("Dark Choc" above) is added to the hot syrup at below about 210 degrees F. The optional hydrocolloid carrageenan is used at about 0.25% to improve mixing properties. When cocoa powder is added and mixed in, the mixture is cooled. In a particular embodiment, the bob syrup plus cocoa powder comprise about 58% of the final composition. The bars can be slabbed, dried, extruded, and/or drop-rolled, as known in the art. The bars can optionally be coated using conventional enrobing machines and procedures.

This product contains about 15% fat, about 28% cocoa powder (or about 23% cocoa solids) and about 140 Calories per 40 gram serving.

Mental Energy, Vigor, Physical Activity Testing

A study was designed to test a bar formulated with high amounts of natural cocoa and cocoa flavanols on the ratings of mental and physical energy. Since the cacao bean contains epicatechin and catechin, flavanols that act as vasodilators through production of nitric oxide, the ingestion of cocoa flavanols can increase blood flow to the brain, potentially increasing concentration, vigor, energy, and focus. Flavanols incorporated into a chocolate bar could provide a functional ingredient to help athletes with the mental demands of the game. However, the high levels of fat and sugar in chocolate bars complying with the standard of identity for dark or milk chocolate may reduce or impair energy. Thus, a high flavanol chocolate supplement or health/energy bar is designed and given to competitive athletes three times during competitive activities. Competitive match play golf was selected as an ideal combination of a physical activity requiring physical stamina over time and sustained mental energy or ability to focus over time. Golf is a game that requires physical strength, finesse and strong concentration. An 18-hole game of golf can take 2-4 h to complete and most golf is played during summer months and/or in warm climates. It is often difficult, especially in competitive situations, to maintain both the physical and mental stamina that golfing demands. Golfers often consume both food and beverages on the golf course. Energy and nutrition bars seem like a good choice for a golf event, however, many are enrobed with chocolate or other coatings that melt in the heat of midday day. For golf and other active outdoor sports, an energy bar/supplement is needed that can improve both mental and physical energy, not melt and be easily portable and consumable A high cocoa content bar is compared to an isocaloric placebo with no cocoa and having similar taste and texture over three rounds of golf to test for improvement in vigor, concentration, and focus.

Study Participants: Seven male golfers competing in a Division I National Collegiate Athletic Association (NCAA) golf tournaments.

Study Design: Subjects randomized in a crossover placebo controlled design. Over a two-week period the golfers played six rounds of golf, at three different courses. At each course, golfers were given the flavanol cocoa health bar for one round and white-chocolate, isocaloric placebo for the other round. The treatment versus placebo was randomly assigned. The placebo was designed to look, smell, and taste like the flavanol cocoa health bar. Golfers were asked not consume a list of high-flavanol and flavanoid containing foods the day before and the day of the test golf rounds.

The bars are eaten one-hour before tee-off, between holes four and five, and eleven and twelve.

Visual analog scales (VAS) used to assess feelings of physical and mental energy among 12 variables (survey of performance accuracy, alertness, concentration, consistency, exhaustion, fatigue, focus, mental energy, pep, physical energy, stamina, worn out) are administered at tee-time, between holes nine and ten, and at the end of the round. A demographic survey and three-day diet records are completed prior to the study and golfers were instructed to avoid foods that contain flavanols (cocoa, chocolate, grape juice, green and black tea) 24 hours before the round of golf.

Data Analysis: A multiple repeated measures ANOVA in SPSS is employed to examine the differences between the flavanol chocolate supplement and the placebo at 3 different courses and times. The numbers representing responses of the participants in Table 2 are average scores (each score being from 0 to 100) for each variable, and the higher the score, except when noted, the more positive the response from the participant.

Results: With comparison to placebo, the flavanol cocoa health bar has significant positive effects on physical energy, concentration, consistency and mental energy (out of 12 variables). When the duration (measures over time) in golf games was taken into consideration, the flavanol cocoa bar had significant positive effects on physical energy, alertness, stamina, focus, consistency, mental energy, and reducing fatigue and worn out (out of 12 variables).

Conclusion: The flavanol cocoa health bar significantly enhances feelings of physical and mental energy during physical activity, such as competitive golf. Each of the factors measured shows an improvement compared to placebo.

TABLE 2

Comparison of energy level scores from visual analog scales (VAS) based on the usages of Cocoa-based bar and placebo in golf games.

| Energy level scores | Cocoa-based bar | Placebo |
|---|---|---|
| Accuracy | 70.02 | 62.29 |
| Alertness | 69.59 | 58.38 |

TABLE 2-continued

Comparison of energy level scores from visual analog scales (VAS) based on the usages of Cocoa-based bar and placebo in golf games.

| Energy level scores | Cocoa-based bar | Placebo |
|---|---|---|
| Concentration | 67.33* | 57.79* |
| Consistency | 57.10* | 45.91* |
| Exhaustion# | 26.15 | 30.37 |
| Fatigue# | 26.21 | 29.02 |
| Focus | 66.88 | 57.59 |
| Mental energy | 70.89* | 63.95* |
| Pep | 65.10 | 60.04 |
| Physical energy | 70.54* | 63.22* |
| Stamina | 68.67 | 63.52 |
| Worn out# | 27.99 | 34.08 | n = 7,
*statistically significant at 0.05 level.
the lower the score, the better expected results

TABLE 3

Comparison of energy level scores from VAS over time based on the usages of Cocoa-based bar and placebo in golf games. The numbers in Table 3 represent the change in scores over the three time points measured (time1-time2 combined with time1-time3 combined with time 2-time3).

| Energy level scores | Cocoa-based bar | Placebo |
|---|---|---|
| Accuracy | −0.24 | 6.40 |
| Alertness | −2.93* | 10.47* |
| Concentration | −0.30 | 9.79 |
| Consistency | −2.40* | 12.78* |
| Exhaustion# | −2.91 | −13.37 |
| Fatigue# | 0.09* | −10.00* |
| Focus | −4.10* | 10.78* |
| Mental energy | −0.05* | 10.09* |
| Pep | 4.25 | 13.76 |
| Physical energy | −3.08* | 6.73* |
| Stamina | −2.64* | 6.18* |
| Worn out# | −2.65* | −15.60* | n = 7,
*statistically significant at 0.05 level.
the lower the score, the better expected results In each factor measured, the results improved over the three time points measured, which results in the negative numbers.

Heat-Resistance and Continuous Processing Compositions

As noted above, another of the advantages of the products and use of the methods of the invention is the high temperature or heat-resistant nature of the products. The products can withstand, for example, storage at 120 degrees F. Additionally, the high levels of cocoa powder or cocoa solids present in the compositions or bars of the invention cannot generally be achieved without changing the texture or water activity required. Furthermore, adding cocoa powder or cocoa solids at the end of the processing of the syrup and fat compositions also affords a greater ability to use continuous processing in production. Extruders and drop roller apparatus can be used without a batch process and without waiting and drying steps.

As in the examples above, the following examples can be produced by preparing a dark chocolate paste and a cooked syrup, mixing the two and mixing in additional cocoa solids, such as the preferred natural cocoa powder.

Table 4 shows an exemplary comparative example and the cocoa content. The final cocoa present is 3.64 grams cocoa per 40 gram serving.

| Ingredient in Method | Cocoa % in Ingredient | comparative Formula % | Cocoa content % |
|---|---|---|---|
| Dark Choc Paste | 18.20 | 50.00 | 9.10 |
| Cooked Syrup | 0.00 | 50.00 | 0.00 |
| Cocoa Powder (natural) | 100.00 | 0.00 | 0.00 |
| total | | 100.00 | 9.10 |

Table 5 (below) shows an example where 10% cocoa powder is added to the chocolate paste and cooked syrup mixture. The final cocoa content is 7.49 grams per 40 gram serving.

| | Cocoa % in Ingredient | 10% Added Example Formula % | Cocoa content % |
|---|---|---|---|
| Dark Choc Paste | 18.20 | 48.00 | 8.74 |
| Cooked Syrup | 0.00 | 42.00 | 0.00 |
| Cocoa Powder (natural) | 100.00 | 10.00 | 10.00 |
| total | | 100.00 | 18.74 |

Table 6 (below) shows an example where 15% cocoa powder is added to the chocolate paste and cooked syrup mixture. The final cocoa content is 9.28 grams per 40 gram serving. This example is characterized by greater heat-resistance than the example of Table 5, and greater still over the example in Table 4. In addition, the continuous processing abilities of the resulting mixture of this example over the example of Table 5 are noticeable.

| Ingredient in Method | Cocoa % in Ingredient | 15% Added Example Formula % | Cocoa content % |
|---|---|---|---|
| Dark Choc Paste | 18.20 | 45.00 | 8.19 |
| Cooked Syrup | 0.00 | 40.00 | 0.00 |
| Cocoa Powder (natural) | 100.00 | 15.00 | 15.00 |
| total | | 100.00 | 23.19 |

Table 7 (below) shows an example where 20% cocoa powder is added to the chocolate paste and cooked syrup mixture. The final cocoa content is 11.06 grams per 40 gram serving. This example is characterized by an even greater heat-resistance than the example of Table 6, and greater still over the example in Table 4-5. In addition, the continuous processing abilities of the resulting mixture of this example over the example of Table 6 are noticeable.

| Ingredient in Method | Cocoa % in Ingredient | 20% Added Example Formula % | Cocoa content % |
|---|---|---|---|
| Dark Choc Paste | 18.20 | 42.00 | 7.64 |
| Cooked Syrup | 0.00 | 38.00 | 0.00 |
| Cocoa Powder (natural) | 100.00 | 20.00 | 20.00 |
| total | | 100.00 | 27.64 |

The products that can be produced from the example of Table 7 are similar to those that can be used in the energy levels scores of athletes above. In addition, the heat-resistant nature of the products means they can be stored and used in hot and desert climates of the world. Nothing in the comparative example having about 9% total cocoa content would predict the ability to double and triple the amount of cocoa in order to produce a more continuous process-capable food composition. On the contrary, the addition of a dry ingredient such as cocoa powder would lead one to believe the composition would be clumpy and be unmanageable and unflowable without adding significant water or moisture. Higher levels of cocoa powder, up to 25% added can also be used in the methods and products of the invention.

The examples presented above and the contents of the application define and describe examples of the many cocoa compositions, products, and methods that can be produced or used according to the invention. None of the examples and no part of the description should be taken as a limitation on the scope of the invention as a whole or of the meaning of the following claims.

What is claimed is:

1. A method of producing a heat-resistant bar or food ingredient having
   about 28% cocoa powder,
   about 20% total fat or less,
   about 0.5% or less of a carrageenan or mixture of carrageenans,
   and sugar or a mixture of sugars and sweeteners,
   the method comprising heating a bob syrup comprising water and sugar to a desired solids content of between about 70 to about 80%; adding a component containing fat to the heated bob syrup; and lastly adding to this mixture the cocoa powder; and allowing the mixture to flow into a final shaping, pressing, or extruding processor, wherein the water activity of the final energy bar or food ingredient is below 0.6.

2. The method of claim 1, wherein the carrageenan or mixture of carrageenans is added to the heated bob syrup.

3. The method of claim 1, wherein the component containing fat comprises cocoa butter.

4. The method of claim 1, further comprising limiting the total calories to about 180 or less per serving size.

5. The method of claim 1, further comprising limiting the total calories to about 150 or less per serving size.

6. The method of claim 1, wherein the heating of the bob syrup is above 210 degrees F. and the adding of cocoa occurs below 210 degrees F.

7. The method of claim 1, further comprising adding one or more of sucrose, chocolate liquor, high fructose corn syrup, cocoa butter, polydextrose, glycerine, corn syrup, sorbitol, milk fat, lactose, salt, carrageenan, soy lecithin, Aldo HMS (emulsifier), PGPR, vanillin.

8. The method of claim 1, further comprising adding one of more of: citrus fruit; orange; tangerine; cranberry; pomegranate; black currant; blueberry; grape; concord grape; white grape; pear; apple; green tea; white tea; grapeseed; raspberries; Japanese knotweed; caffeine; theobromine; guarana; taurine; and an appetite suppressing agent.

9. The method of claim 1, further comprising adding ingredients consisting of cocoa liquor, fruit, fruit extract, vanillin, caramel, mint, orange, natural or artificial flavors, canola oil, sunflower oil, fructose, inulin, chromium picolinate, plant sterols, nutritional supplements, vitamins, minerals, and co-enzyme Q10.

10. The method of claim 1, wherein the final shaping or pressing is selected from one of: extruding; drop-rolling; pressing; or a combination of any of these.

11. A health bar or food ingredient made from the method of one of claims 1 to 10.

12. A method of producing an energy bar or food ingredient having
- 28% cocoa powder, which has about 23% or more cocoa solids,
- about 20% total fat or less,
- about 0.5% or less of a carrageenan or mixture of carrageenans,
- and sugar or a mixture of sugars,
- the method comprising selecting ingredients for a bob syrup comprising water and sugar to limit solids content to between about 70-80%; adding a component containing fat to the bob syrup; and thereafter adding to the mixture a cocoa product to a level equivalent to 23% cocoa solids or more, wherein the water activity of the final energy bar or food ingredient is below 0.6.

13. A method of improving the energy level in a subject comprising providing a heat-resistant, consumable composition having about 8 grams or more of cocoa powder per 40 gram serving, and administering the composition approximately one hour before and again during physical activity.

14. The method of claim 13, further comprising measuring the physical or mental energy levels of the subject after administration.

15. The method of claim 13, further comprising limiting the caloric ingestion of other foods during the physical activity.

16. The method of claim 13, wherein the consumable composition further comprises about 20% fat or less.

17. The method of one of claim 13-16, wherein the cacao bean source of the cocoa powder is selected from one or more of unroasted cacao beans, unfermented cacao beans, medium roasted cacao beans, and highly roasted cacao beans.

18. The method of one of claims 13-16, wherein the cocoa powder is natural cocoa powder.

19. A heat-resistant energy bar for consumption during physical activity, comprising about 28% cocoa powder, which has about 23% or more cocoa solids in the final product, about 20% total fat or less, about 0.5% or less of a carrageenan or mixture of carrageenans, and sugar or mixture of sugars, wherein the energy bar contains about 180 total calories or less, and wherein the health bar is heat-resistant to about 120 degrees F. and shelf stable for at least one month.

20. The energy bar of claim 19, wherein one or more of the following is added: coenzyme Q, guarana, caffeine epicatechin, EGCG, maltodextrin, protein, and plant phytosterols.

21. The energy bar of claim 19, wherein the bar contains about 40/30/30% carbohydrates/protein/fat on an available energy basis.

22. The energy bar of claim 19, further comprising fruit or fruit flavor.

23. The energy bar of claim 19, further comprising an antioxidant food ingredient.

24. The energy bar of claim 19, wherein the water activity level is about 0.5 or lower.

* * * * *

UNITED STATES PATENT AND TRADEMARK OFFICE
CERTIFICATE OF CORRECTION

| | | |
|---|---|---|
| PATENT NO. | : 8,088,431 B2 | Page 1 of 1 |
| APPLICATION NO. | : 12/049002 | |
| DATED | : January 3, 2012 | |
| INVENTOR(S) | : Ward et al. | |

It is certified that error appears in the above-identified patent and that said Letters Patent is hereby corrected as shown below:

In the claims:

In claim 8, column 14, lines 51 and 52, insert --one or more of the-- before "ingredients from the group consisting of"; and in line 52, delete "orange; tangerine;".

Signed and Sealed this
Twenty-eighth Day of February, 2012

David J. Kappos
*Director of the United States Patent and Trademark Office*